United States Patent
Träger et al.

[11] Patent Number: 5,550,170
[45] Date of Patent: Aug. 27, 1996

[54] PROCESS FOR THE PRODUCTION OF FOAM BEADS

[75] Inventors: Michael Träger, Haltern; Reinhard Wirobski, Marl; Thomas Leven, Lüdenscheid, all of Germany

[73] Assignee: Huels Aktiengesellschaft, Marl, Germany

[21] Appl. No.: 309,438

[22] Filed: Sep. 20, 1994

[30] Foreign Application Priority Data

Sep. 25, 1993 [DE] Germany ............... 43 32 724.9

[51] Int. Cl.$^6$ ............................................. C08J 9/16
[52] U.S. Cl. .................. 521/143; 521/56; 521/58; 521/144; 264/51; 264/53; 264/54; 264/517
[58] Field of Search ................. 521/56, 58, 60, 521/142, 143, 144; 264/51, 53, 54, 517

[56] References Cited

U.S. PATENT DOCUMENTS

| | | | |
|---|---|---|---|
| 5,071,883 | 12/1991 | Kuwabara et al. | 521/60 |
| 5,229,049 | 7/1993 | Maeda | 521/60 |
| 5,234,962 | 8/1993 | de Grave et al. | 521/56 |
| 5,340,841 | 8/1994 | Tokoro et al. | 521/60 |

FOREIGN PATENT DOCUMENTS

| | | |
|---|---|---|
| 0235426 | 9/1987 | European Pat. Off. |
| 0467221 | 1/1992 | European Pat. Off. |

*Primary Examiner*—James J. Seidleck
*Assistant Examiner*—John M. Cooney, Jr.
*Attorney, Agent, or Firm*—Oblon, Spivak, McClelland, Maier & Neustadt, P.C.

[57] ABSTRACT

The production of approximately spherical polyolefin foam particles having a coarse cell structure and a narrow cell size distribution by dispersion foaming is achieved by a process in which the reactor contents, which essentially comprise polyolefin particles, a liquid dispersion medium and, if desired, a volatile blowing agent, are first treated at a first temperature above the crystallite melting point $T_m$ of the polyolefin, and subsequently passed through a cooling device, in which the dispersion is brought to a second, lower temperature, and the polymer particles are then foamed at this temperature. The foamed particles can be converted into moldings by known methods.

24 Claims, No Drawings

PROCESS FOR THE PRODUCTION OF FOAM BEADS

BACKGROUND OF THE INVENTION

1. Field of the Invention

The present invention pertains to a process for the production of polyolefin foam beads which have a coarse cell structure and a narrow cell size distribution.

2. Description of the Related Art

A number of processes are known for the production of polyolefin foam beads by dispersion foaming. For example, DE-A-21 55 775 describes a process in which a dispersion of polymer particles in a liquid dispersion medium is heat-treated under pressure and foamed with subsequent decompression. The explanation for the foaming is that the dispersion medium infiltrates cavities of the polymer and acts as a blowing agent on discharging into a low-pressure space. In order to simplify the infiltration, the polymer should contain from 10 to 70% by weight of a filler. This method gives prefoam beads having a fine and uniform cell structure. As the examples show, however, the expansion rate is not uniform. It has been found in practice that conversion of these prefoam beads into foamed moldings is difficult due to the high filler content and the small cell diameter.

EP-A-0 053 333 describes the foaming, in particular, of ethylene-propylene random copolymers using a system comprising polymer particles, water as dispersion medium, a solid dispersion auxiliary and a volatile blowing agent.

EP-A-0 071 981 discloses that polypropylene foam beads can be welded together to provide dimensionally stable moldings, if the size of the gas-filled cells within the foam is adjusted so that not more than 300 cells are present per $mm^2$ in a cross-section, the molding having a density of from 0.026 to 0.060 $g/cm^3$ and having a latent heat of crystallization of from 9 to 28 cal/g. However, this publication gives no indication of the technical measures necessary to obtain this cell content.

In addition, EP-A-0 095 109 teaches that, in order to achieve a uniform cell structure and a constant expansion rate during the discharge operation, not only must the internal temperature be kept constant as precisely as possible, but also the internal pressure and the partial pressure of the blowing agent must remain at a constant level.

However, the subsequent introduction of cold inert gases or cold blowing agent, which must evaporate in the reactor due to absorption of heat, depending on its state, means that the reactor contents are cooled, which is undesired. In EP-A-0 290 943, this cooling is avoided by introducing a heating fluid to maintain the liquid level in the reactor, and thus the pressure and temperature, the same. However, since considerable amounts of heating fluid must be introduced, this process uses a significant amount of energy.

It is thus evident from the prior art that considerable effort must be made to keep the temperature of the reactor contents constant during the discharge operation in order to achieve a uniform cell structure of the foam beads.

It is furthermore desired for the processing of the foam beads that they have—in addition to a uniform cell structure and a relatively large cell diameter—an approximately spherical shape so that they fill a mould as completely as possible. This can be achieved by subjecting the polymer particles in the reactor to heat treatment above their crystallite melting point, $T_m$. In addition to the rounding of the particles to give a spherical shape, this process also provides the benefit that only a relatively small amount of blowing agent is required. However, the resultant foam beads have very small cells and can therefore only be processed with difficulty.

If, by contrast, the heat treatment is carried out in the temperature range below $T_m$, the foamed particles have the shape of the granules employed, i.e. they are generally more or less cylindrical, which has an unfavorable effect on the surface structure of the moldings produced therefrom.

Neither can the above-described disadvantages be overcome by a combination of the two procedures. If the heat treatment is carried out, for example, at temperatures above $T_m$ and the polymer particles in the reactor are subsequently cooled, before the expansion, to a temperature below $T_m$, foam beads with cells which are smaller than desired are obtained and which further exhibit considerable shrinkage during conversion into moldings.

OBJECTS OF THE INVENTION

The object of the present invention is therefore to develop a simple process for the production of approximately spherical foam particles having a coarse cell structure and a narrow cell size distribution. In addition, a further object is to provide foam particles wherein the expansion rate and cell size may be set to specific values.

SUMMARY OF THE INVENTION

Surprisingly, it has been found that these and other objects are achieved if the reactor contents, which essentially comprise polyolefin particles, a liquid dispersion medium and, if desired, a volatile blowing agent, are first treated at a first temperature above the crystallite melting point $T_m$ of the polyolefin and subsequently passed through a cooling device, in which the dispersion is brought to a second, lower temperature, and the polymer particles are then foamed at the latter temperature.

The device serving for the cooling of the dispersion exit stream can be any conceivable device which satisfies this purpose. In a preferred embodiment, a heat exchanger is used to this end. A further preferred embodiment comprises metering a cold fluid, for example cold dispersion medium or another cold, inert, liquid or gaseous substance, such as, for example, a cold stream of nitrogen, into the dispersion exit stream. In order to come to a defined expansion temperature, the cooling medium metered in must be matched in amount and temperature to the flow rate and temperature of the dispersion exit stream.

DESCRIPTION OF THE PREFERRED EMBODIMENTS

Examples of polyolefins are propylene polymers, such as propylene-ethylene or propylene-butylene random copolymers, random terpolymers of ethylene, propylene and 1-butene, ethylene-propylene block copolymers and homopolypropylene, ethylene polymers, such as low-, medium and high-density polyethylene, linear low-density polyethylene, ethylene-vinyl acetate copolymers, ethylene-methyl methacrylate copolymers, ionomers or other polyolefins, such as poly-1-butene. Preference is given to an ethylene-propylene random copolymer containing from 1 to 15% by weight of ethylene.

These polymers are in the form of discrete particles. They preferably have a mean particle diameter of from 0.5 to 5 mm. In order to achieve uniform foaming, they can, if necessary, contain a conventional filler to act as a nucleating agent.

The preferred dispersion medium is water. Also suitable, however, are, for example, alcohols, such as methanol or ethanol.

In order to prevent agglomeration, a finely divided dispersion auxiliary and/or a surface-active compound can be added to the mixture of polymer particles and dispersion medium. Examples of these are calcium phosphate, basic magnesium carbonate, basic zinc carbonate, calcium carbonate, aluminum oxide, barium sulphate, talc, alkylbenzenesulphonates, paraffinsulphonates and ethoxylates.

The density of the foam beads is expediently adjusted by additionally adding a volatile blowing agent. Suitable blowing agents are known from the prior art; for example, it is possible to use saturated aliphatic hydrocarbons, such as ethane, propane, n-butane, i-butane, pentane or hexane, alicyclic hydrocarbons, such as cyclopentane or cyclohexane, halogenated hydrocarbons, such as trichloromonofluoromethane, dichlorodifluoromethane, dichlorotetrafluoroethane, trichlorotrifluoroethane, dichloromonofluoromethane, methyl chloride, methylene chloride or ethyl chloride, and inorganic gases, such as, for example, carbon dioxide or nitrogen, in each case individually or as a mixture.

If a volatile blowing agent is not added, the dispersion medium acts as a blowing agent even on its own. In this way, although only moderate expansion rates are achieved, this is entirely desirable for many applications, for example where a somewhat stiffer foam is required.

For the purposes of the present invention, the crystallite melting point $T_m$ is determined from a DSC measurement, in which a sample of the polyolefin is heated to 250° C. at a rate of 10° C./min, then cooled to 50° C. at a rate of 10° C./min and subsequently re-heated at a rate of 10° C./min. The peak which occurs here is the $T_m$. In a preferred embodiment, the first treatment temperature is in the range between $T_m+1°$ C. and $T_m+20°$ C., more preferably between $T_m+5°$ C. and $T_m+15°$ C.

The duration of the heat treatment can be readily established by those skilled in the art. The hold time is usually in the range from 5 minutes to 2 hours, preferably from 15 to 60 minutes.

The second, lower treatment temperature is above the softening point of the polyolefin used, and is determined in accordance with ASTM D 648 under a load of 4.6 kg/mm². It is preferably from 5° to 25° C. below the first temperature.

In principle, the reactor content exit stream can be cooled to the second temperature using any device which satisfies this purpose. For example, it is in principle possible to employ any known heat exchanger through which the dispersion will pass. The only prerequisite is that it is designed in such a way that the desired heat exchange can be accomplished. The flow path should preferably not be unnecessarily diverted. The free cross-sectional area of individual elements must be matched to the particle size. The residence time of the dispersion in the heat exchanger is generally not more than several minutes, i.e. 2–5, preferably not more than 2–3 minutes, usually from 1 to 100 seconds, more preferably from 5 to 20 seconds. The term "short residence time" means a period of time sufficient to reduce the temperature of the reactor exit stream to the desired second temperature. The residence time, first temperature, and second temperature should be adjusted appropriately in order to obtain expandable polyolefin beads having a coarse cell structure, a narrow cell size distribution, and a substantially spherical as opposed to rounded over cylindrical shape.

Precise adjustment of the desired cell size is achieved in this process by passing the stream leaving the cooling device through a length of piping which is preferably heat-insulated. By merely altering the length of the piping, the residence time of the expandable particles at the foaming temperature may be increased or decreased in a simple fashion. The length of piping should be dimensioned in such a way that the dispersion preferably has a residence time therein of not more than several minutes, preferably from 1 to 100 seconds, and more particularly from 5 to 20 seconds.

The diameter of the decompression nozzle should be matched to the particle diameter in such a way that, whenever possible, only one particle at a time passes through, since otherwise there is a risk of the particles agglomerating with one another during the foaming operation. Otherwise, any nozzle geometry may be used.

The foamed polymer particles are subsequently collected and dried in the conventional manner. In general, foam densities of from 15 to 100 g/l are thus obtained.

Obviously, numerous modifications and variations of the present invention are possible in light of the above teachings. It is therefore to be understood that within the scope of the appended claims, the invention may be practiced otherwise than as specifically described herein.

The foamed polymer particles can be converted into moldings by known methods. In the machines used for this purpose, the polymer foam is softened or melted slightly under pressure with the aid of steam at, for example from 1 to 5 bar, during which the individual foam particles weld together to form a molding.

Having generally described this invention, a further understanding can be obtained by reference to certain specific examples which are provided herein for purposes of illustration only and are not intended to be limiting unless otherwise specified.

Comparative Example 1

In a 40 liter reactor, a suspension comprising:

| | |
|---|---|
| 100 | parts of water, |
| 20 | parts of an ethylene-propylene random copolymer having $T_m = 143°$ C., |
| 3.5 | parts of pentane/hexane (6:1), |
| 0.3 | part of tricalcium phosphate and |
| 0.01 | part of MARLON ® A 360, | was heated to 136° C. with stirring, and stirred at this temperature for 30 minutes. When this hold time was complete, the reactor pressure was increased to 28 bar by means of nitrogen and the contents were discharged via a nozzle into a low-pressure space, to produce expanded polymer particles.

The foamed particles were isolated and dried. In order to determine the cell content, scanning electron photo-micrographs of sections were evaluated. The processing behaviour was tested using an automatic molding machine, with filling by the compression method. An assessment was made of the weldability of the foam particles, the energy consumption and the shrinkage of the moldings. The results are shown in Table 1.

Comparative Example 2

Comparative Example 1 was repeated with the exception that the amount of blowing agent was reduced to 1.5 parts, and the reactor was heated to 157° C. with stirring, and stirred at this temperature for 30 minutes. The batch was subsequently cooled to 136° C. with continued stirring. When this temperature was reached, the reactor pressure was increased to 28 bar by means of nitrogen and the contents were discharged via a nozzle into a low-pressure space. The remainder of the procedure was as in Comparative Example 1; the results are shown in Table 1.

EXAMPLE 1

Comparative Example 1 was repeated, with the exception that the amount of blowing agent was reduced to 0.7 part, and the reactor was heated to 157° C. with stirring, and stirred at this temperature for 30 minutes. When this hold time was complete, the reactor pressure was increased to 28 bar by means of nitrogen and the contents were directed through a temperature-controlled heat exchanger to a nozzle, whereupon the particles were discharged into a low-pressure space. The heat exchanger was held at such a temperature that the dispersion temperature at the exit (nozzle end) of the heat exchanger was 136° C. (foaming temperature). A vertical tube-bundle heat exchanger was employed here, with flow from the bottom. The residence time of the dispersion in the heat exchanger was about 10 seconds.

The remainder of the procedure was as in Comparative Example 1; the results are shown in Table 1.

EXAMPLE 2

Example 1 was repeated, with the exception that the amount of blowing agent was increased to 0.9 part; in addition, the suspension was passed through a heat-insulated length of piping arranged between the heat exchanger and the nozzle (residence time about 10 seconds). The dispersion temperature at the end of the tube was 136° C. The results are shown in Table 1.

discharge operation in order to ensure a uniform expansion rate. Thus, a drop in the internal temperature can be compensated by corresponding regulation of the cooling device through which the stream flows, which is an additional advantage of the process according to the invention.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the production of expanded polyolefin foam particles, comprising
   (a) heating a liquid dispersion of polyolefin particles to a first temperature which is above the crystallite melting point $T_m$ of the polyolefin, and applying increased pressure to the liquid dispersion optionally in the presence of a volatile blowing agent, to obtain a heated dispersion (a);
   (b) passing the heated dispersion (a) prior to decompression for foaming the polyolefin particles through a cooling device having a short residence time and terminated by one or more expansion nozzles, such that the temperature (second temperature) of the dispersion upon exiting said cooling device is lower than said first temperature but is above the softening point of the polyolefin,
   c) allowing the dispersion to discharge through the expansion nozzles; and
   d) collecting from said nozzle(s) an expanded polyolefin product.

2. The process of claim 1 wherein said first temperature is in the range of from $T_m+1°$ C. to about $T_m+20°$ C.

3. The process of claim 1 wherein said second temperature is from 5° C. to 25° C. below said first temperature.

4. The process of claim 2 wherein said second temperature is from 5° C. to 25° C. below said first temperature.

|  | Amount of blowing agent [parts] | Foam density [g/l] | Bulk density [g/l] | Cells Size [μm] | Cells Number [mm²] | Particle shape | Processing |
|---|---|---|---|---|---|---|---|
| Comparative Example 1 | 3.5 | 77 | 44 | 100–500 | 65 | cylinder | good; surface somewhat uneven |
| Comparative Example 2 | 1.5 | 75 | 43 | 2–100 | 10,000 | sphere | poor |
| Example 1 | 0.7 | 87 | 46 | 150–300 | 120 | sphere | good; smooth surface |
| Example 2 | 0.9 | 79 | 41 | 70–150 | 200 | sphere | good smooth surface |

The experimental results show that a rapid and large temperature change acting on the polyolefin has a significant effect on the cell size and cell size distribution. The cell size can be adjusted in a downstream heat-insulated length of piping.

Corresponding results are also obtained using larger amounts of blowing agent to produce lower foam densities, for example 20 g/l, or using other blowing agents. Importantly, and as illustrated by the examples, excellent foams may be obtained from expandable polyolefins prepared from lower quantities of volatile blowing agents. This is of exceptional importance for environmental concerns.

Further, experiments have shown, that in contrast to the prior methods of manufacture, it is not necessary to keep the internal temperature of the reactor constant during the 5. The process of claim 1 wherein said residence time is from 1 to about 100 seconds.
6. The process of claim 2 wherein said residence time is from 1 to about 100 seconds.
7. The process of claim 3 wherein said residence time is from 1 to about 100 seconds.
8. The process of claim 4 wherein said residence time is from 1 to about 100 seconds.
9. The process of claim 1 wherein said residence time is from 5 to about 20 seconds.
10. The process of claim 2 wherein said residence time is from 5 to about 20 seconds.
11. The process of claim 3 wherein said residence time is from 5 to about 20 seconds.
12. The process of claim 4 wherein said residence time is from 5 to about 20 seconds.

13. The process of claim 1 wherein said cooling device comprises a heat exchanger.

14. The process of claim 5 wherein said cooling device comprises a heat exchanger.

15. The process of claim 9 wherein said cooling device comprises a heat exchanger.

16. The process of claim 1 wherein said cooling device comprises a heat-insulated length of piping.

17. The process of claim 5 wherein said cooling device comprises a heat-insulated length of piping.

18. The process of claim 9 wherein said cooling device comprises a heat-insulated length of piping.

19. The process of claim 1, wherein a cold fluid is metered into said cooling device.

20. The process of claim 13, wherein a cold fluid is metered into said cooling device.

21. The process of claim 16, wherein a cold fluid is metered into said cooling device.

22. The process of claim 1 wherein said polyolefin comprises an ethylene-propylene random copolymer containing from 1 to 15 weight percent ethylene.

23. A process for the production of expanded polyolefin particles having a substantially spherical shape, coarse cell size, and narrow cell size distribution, comprising a) heating a dispersion of polyolefin particles to a first temperature which is from 1° C. to about 20° C. above the crystallite melting point $T_m$ of said polyolefin, and applying increased pressure to the liquid dispersion optionally in the presence of a volatile blowing agent to obtain a heated dispersion (a);

b) passing the heated dispersion (a) prior to decompression for foaming the polyolefin particles through a cooling device for a short residence time of from 1 to about 100 seconds, the cooling device being terminated by one or more expansion nozzles, such that the temperature (second temperature) of said dispersion upon exiting said cooling device is lower than the first temperature but is above the softening point of the polyolefin;

c) allowing the dispersion to discharge through the expansion nozzles; and d) collecting from said nozzle(s) an expanded polyolefin product.

24. The process of claim 23 wherein said second temperature is below $T_m$.

* * * * *